United States Patent
Hawkins

(10) Patent No.: US 6,725,800 B2
(45) Date of Patent: Apr. 27, 2004

(54) ACCUMULATING WHISTLING VENT

(75) Inventor: Murray Hawkins, Bamfield (CA)

(73) Assignee: Enviro Technology Products, Ltd. (CA)

( * ) Notice: Subject to any disclaimer, the term of this patent is extended or adjusted under 35 U.S.C. 154(b) by 0 days.

(21) Appl. No.: 10/375,240

(22) Filed: Feb. 27, 2003

(65) Prior Publication Data

US 2003/0140841 A1 Jul. 31, 2003

(51) Int. Cl.[7] .......................... G01F 23/00; G01F 23/02
(52) U.S. Cl. .................................. 116/109; 137/558
(58) Field of Search ........................ 116/109, 112, 116/227; 141/94, 95; 137/558

(56) References Cited

U.S. PATENT DOCUMENTS

| | | | |
|---|---|---|---|
| 753,600 A | 3/1904 | Maul | 137/213 |
| 977,017 A | 11/1910 | Kinney | 116/112 |
| 1,116,934 A | 11/1914 | Seltzer et al. | 116/109 |
| 1,566,338 A | 12/1925 | Mayhew | 116/109 |
| 2,135,522 A | 11/1938 | Mathey | 137/558 |
| 2,143,476 A | 1/1939 | Crossley | 137/558 |
| 2,143,492 A | 1/1939 | Morse | 137/558 |
| 2,143,706 A | 1/1939 | Mathey | 137/558 |
| 2,212,620 A | 8/1940 | Scully et al. | 137/558 |
| 2,227,322 A | 12/1940 | Scully et al. | 137/558 |
| 2,227,323 A | 12/1940 | Scully et al. | 137/558 |
| 2,249,180 A | 7/1941 | Scully et al. | 137/558 |
| 2,257,656 A | 9/1941 | Scully et al. | 116/109 |
| RE21,930 E | 10/1941 | Scully et al. | 116/109 |
| 2,276,798 A | 3/1942 | Scully et al. | 137/110 |
| 2,323,156 A | 6/1943 | Scully et al. | 116/109 |
| 2,330,983 A | 10/1943 | Mathey | 116/109 |
| 2,531,950 A | 11/1950 | Scully | 137/558 |
| 2,642,831 A * | 6/1953 | Moye | 116/109 |
| 2,716,389 A | 8/1955 | Mathey | 116/109 |
| 2,831,452 A | 4/1958 | Haynes | 141/95 |
| 2,905,137 A | 9/1959 | Milnes | 116/112 |
| 2,910,956 A | 11/1959 | Scully | 116/109 |
| 2,935,099 A | 5/1960 | Haynes | 141/95 |
| 2,964,009 A | 12/1960 | Rudolf | 116/112 |
| 2,972,362 A | 2/1961 | Gardner | 141/96 |
| 3,136,295 A | 6/1964 | Gramo | 116/109 |
| 3,924,559 A * | 12/1975 | Renner et al. | 116/109 |
| 5,023,608 A | 6/1991 | Delisle, Jr. et al. | 340/984 |
| 5,445,196 A * | 8/1995 | Tyree, Jr. | 141/297 |
| 5,501,255 A * | 3/1996 | Tortu et al. | 141/95 |
| 5,832,968 A | 11/1998 | Leary | 141/94 |
| 6,000,359 A | 12/1999 | Hudson, Jr. et al. | 116/109 |
| 6,182,710 B1 * | 2/2001 | Webb | 141/1 |

FOREIGN PATENT DOCUMENTS

| WO | WO 00/63108 | 10/2000 | B67D/5/04 |
|---|---|---|---|

* cited by examiner

Primary Examiner—Diego Gutierrez
Assistant Examiner—R. Alexander Smith
(74) Attorney, Agent, or Firm—Hayes Soloway P.C.

(57) ABSTRACT

An accumulating whistling vent for indicating a level of liquid in a tank having a vent line is disclosed. The whistling vent includes a whistle housing reservoir which has mounting tubes extending from either ends. A whisle is housed in the whistle housing reservoir by insertion into one of the mounting tubes. The whistling vent is coupled between the vent line of the tank such that the tube containing the whistle is closest to the tank. As liquid is introduced into the tank an audible signal is produced by the whistle. Once full, air flowing from the tank through the vent line is replaced by the incoming liquid, thus muting the whistle. Excess liquid is accumulated in the reservoir prior to discharge from the vent line, thereby providing additional time to respond to the change in audible signal. In a preferred embodiment of the invention, a transparent reservoir is used to provide a visual indicator in addition to the change in audible signal. In another preferred embodiment of the invention a fuel filter and brass key chain whistle are used to minimize manufacturing costs.

9 Claims, 3 Drawing Sheets

ACCUMULATING WHISTLING VENT

FIELD OF THE INVENTION

The present invention generally relates to a level indicating device for filling fluid tanks. More specifically the present invention relates to a whistling vent.

BACKGROUND OF THE INVENTION

It is well known in the art of tank filling to employ a whistling device for detecting fluid levels. Such devices have been known since 1904 as shown in U.S. Pat. No. 753,600, issued to Maul. Whistling vents, as they are commonly referred to, typically produce a change in audible signal when a particular level of fluid is reached, most often "Full". For example, a whistle may sound while the tank is filling and become silent at the prescribed level, or alternatively, begin sounding when filling should stop. Often times these devices contain numerous parts, are difficult to assemble, and are expensive to manufacture.

More recently whistling vents have been incorporated into vent tubes of fuel tanks such as those typically found on boats. See for example U.S. Pat. No. 5,832,968 issued to Leary on Nov. 10, 1998.

One drawback of the Leary system is that no safeguard is in place if the signal is missed and the tank overflows. This could occur, for example, when noisy machinery is present or during bad weather. In these instances fuel can spill overboard thus damaging the environment and creating a potential fire hazard.

A need therefore has been identified for an improved whistling vent that can safeguard against overflow.

SUMMARY OF THE INVENTION

It is therefore an object of the present invention to provide an accumulating whistling vent which obviates or mitigates at least one of the disadvantages identified above.

In accordance with the present invention there is provided an accumulating whistling vent comprising: a whistle housing reservoir having an first and second end wherein a mounting tube extends from each of the ends; a whistle; wherein the intake of the whistle is housed within the mounting tube extending from the first end of the whistle housing reservoir; wherein the exhaust of the whistle extends into the whistle housing reservoir; wherein the whistle generates an audible signal when gaseous fluids pass therethrough; and wherein the whistle housing reservoir accumulates liquid fluids passing through the whistle.

In accordance with the present invention there is also provided an accumulating whistling vent comprising: a reservoir base having a mounting tube extending therefrom; a lid having a mounting tube extending therefrom; and a whiste; wherein the lid is attached to the reservoir base such that a liquid fluid seal is formed; wherein the intake of the whistle is housed within the mounting tube of the reservoir base; wherein the exhaust of the whistle extends into the reservoir base; wherein the whistle generates an audible signal when gaseous fluids pass therethrough; and wherein the reservoir base accumulates liquid fluids passing through the whistle.

The invention is also directed to an accumulating whistling vent as set out above wherein the whistle housing reservoir or reservoir base is translucent.

The invention is also directed to an accumulating whistle as set out above wherein the reservoir base and lid include a fuel filter base and fuel filter lid.

In accordance with the present invention there is also provided a level indicating system for use in a tank having a vent line comprising: an accumulating whistling vent including: a whistle housing reservoir having first and second ends wherein a mounting tube extending from each of the ends; a whistle; wherein the intake of the whistle is housed within the mounting tube in the first end of the whistle housing reservoir; wherein the exhaust of the whistle extends into the whistle housing reservoir; wherein the whistle generates an audible signal when gaseous fluids pass therethrough; wherein the whistle housing reservoir accumulates liquid fluids passing through the whistle; and wherein the accumulating whistling vent is coupled between the vent line such that the first end is closest to the tank.

In accordance with the present invention there is also provided a level indicating system for use in a tank having a vent line comprising: an accumulating whistling vent including: a reservoir base having a mounting tube extending therefrom; a lid having a mounting tube extending therefrom; a whistle; wherein the lid is attached to the reservoir base such that a liquid fluid seal is formed; wherein the intake of the whistle is housed within the mounting tube of the reservoir base; wherein the exhaust of the whistle extends into the reservoir base; wherein the whistle generates an audible signal when gaseous fluids pass therethrough; wherein the reservoir base accumulates liquid fluids passing through the whistle; and wherein the accumulating whistling vent is coupled between the vent line such that the reservoir base is closest to the tank.

BRIEF DESCRIPTION OF THE DRAWINGS

These and other features of the invention will become more apparent from the following description in which reference is made to the appended drawings which.

DETAILED DESCRIPTION OF THE PREFERRED EMBODIMENT

Figure 1:
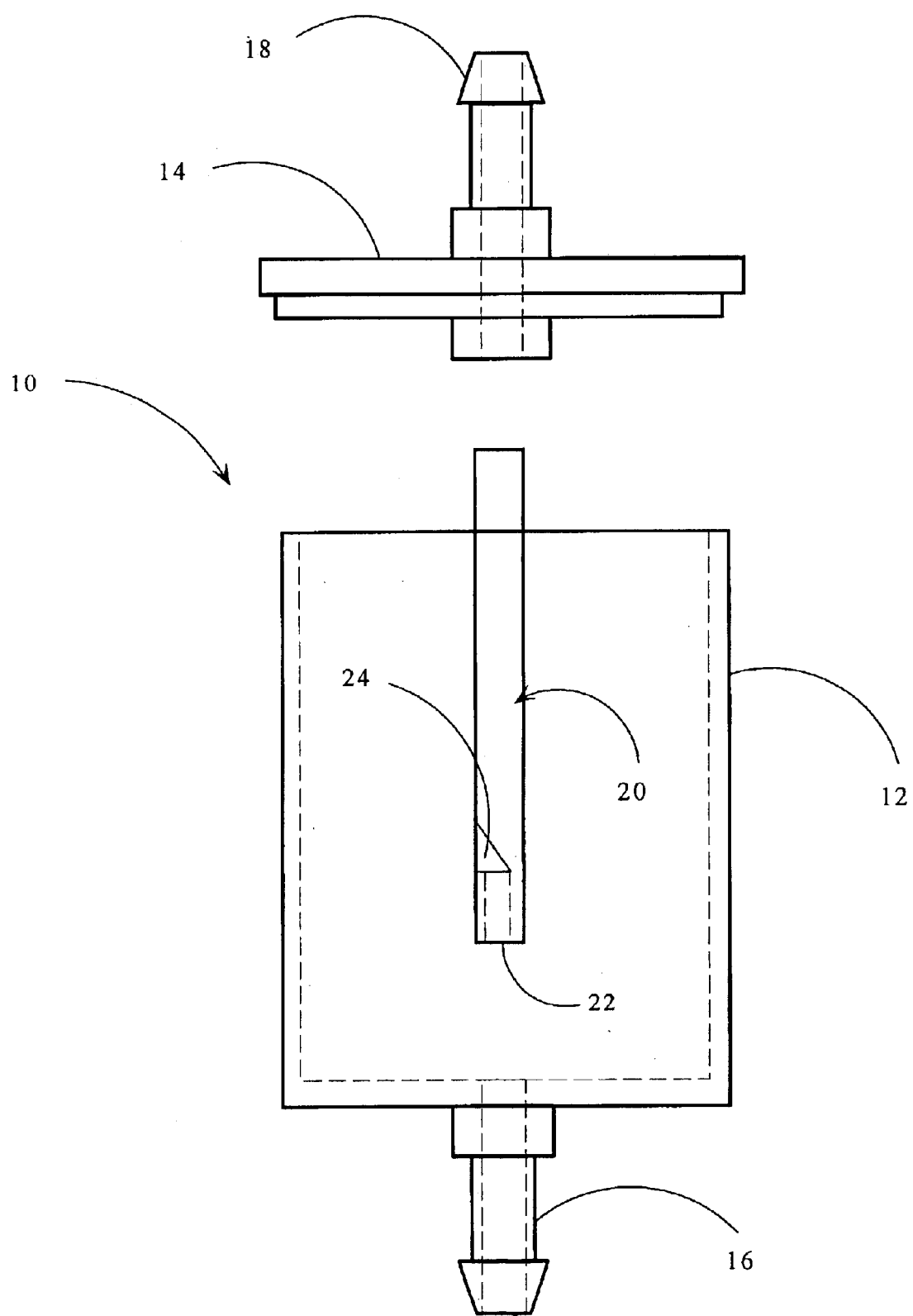
FIG. 1 presents an exploded side view of an accumulating whistling vent in accordance with a preferred embodiment of the present invention.
Figure 2:
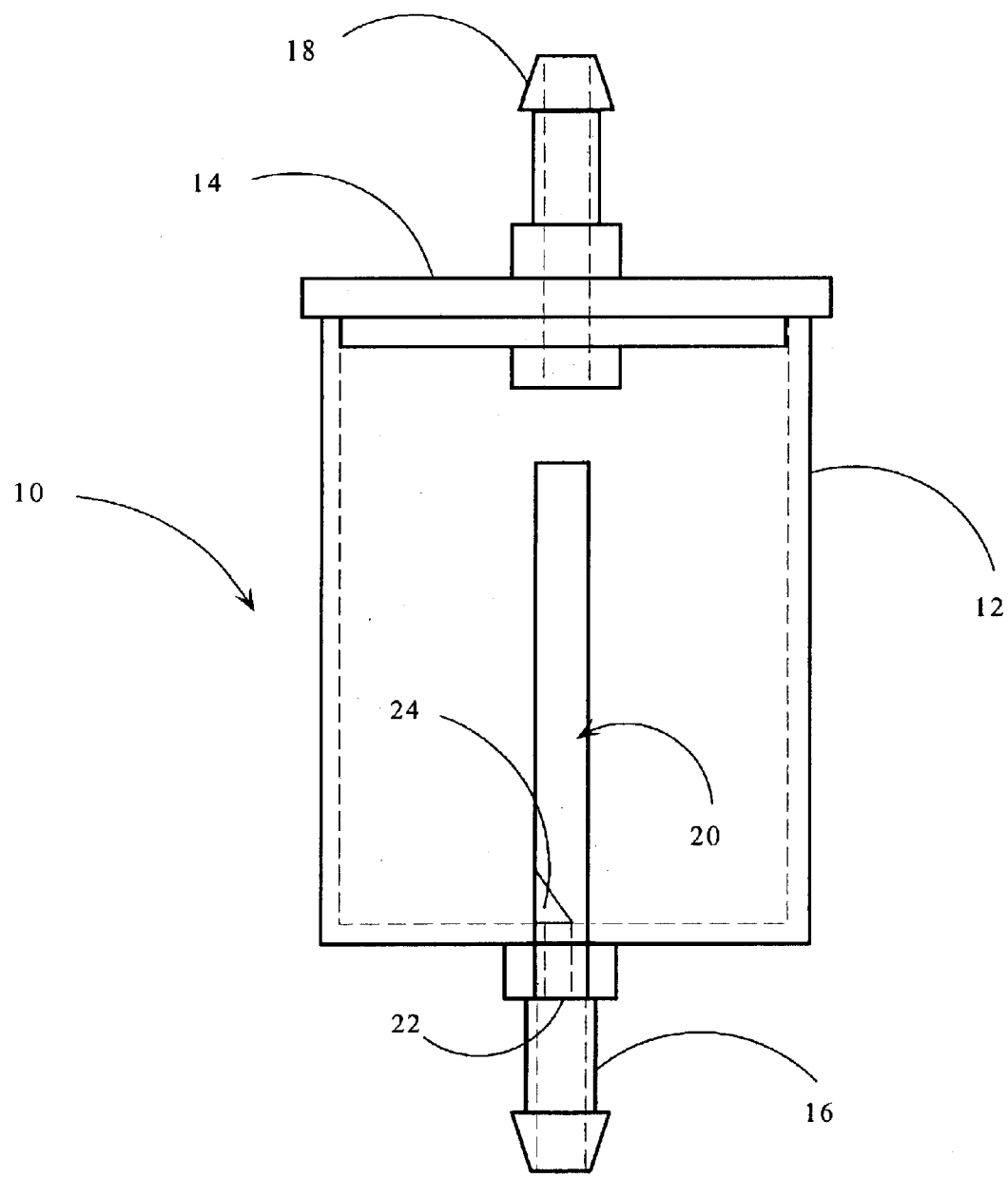
FIG. 2 presents an assembled side view of an accumulating whistling vent in accordance with a preferred embodiment of the present invention.

Referring to FIGS. 1 and 2, a side elevation of a preferred embodiment of an accumulating whistling vent is shown generally by reference number 10. Accumulating whistling vent 10 includes a reservoir base 12 and lid 14. Extending from both reservoir base 12 and lid 14 are mounting tubes 16 and 18, respectively, whose function is described below in greater detail.

In accordance with a preferred embodiment of the invention reservoir base 12, lid 14 and mounting tubes 16 and 18 include an automobile fuel filter. As will be apparent to one skilled in the art, it is not essential to the invention described in the summary that a "fuel filter" be used. Any structural component providing the functionality described below could be used in substitution thereof.

Housed in reservoir base 12 is whistle 20. More specifically, whistle intake 22 is housed in mounting tube 16 such that whistle exhaust 24 extends into reservoir base 12. In the preferred embodiment of the invention, whistle 20 is a brass key chain whistle that has been slightly tapered to ease insertion into mounting tube 16.

As will be appreciated by one skilled in the art, a brass key chain whistle is not essential to the invention described in the summary and could be substituted with any other type of whistle capable of producing the audible signal, and accommodating the fluid flow, described below.

In the preferred embodiment of the invention lid 14 is sealed to reservoir base 12 with glue (not shown) to prevent lid 14 from becoming dislodged during a filling operation. As will be apparent to one skilled in the art, however, glue is not necessary for this purpose and could be substituted by any other sealing means known in the art including, for example, an interference fit. Alternatively, reservoir base 12 and lid 14 could be substituted with a one piece whistle housing reservoir of similar structure, said piece being formed by plastic injection moulding, for example. The only restriction imposed by a one piece construction is ensuring that whistle 20 can be inserted through mounting tube 16, or alternatively is incorporated into the whistle housing reservoir during the manufacturing process.

Figure 3:
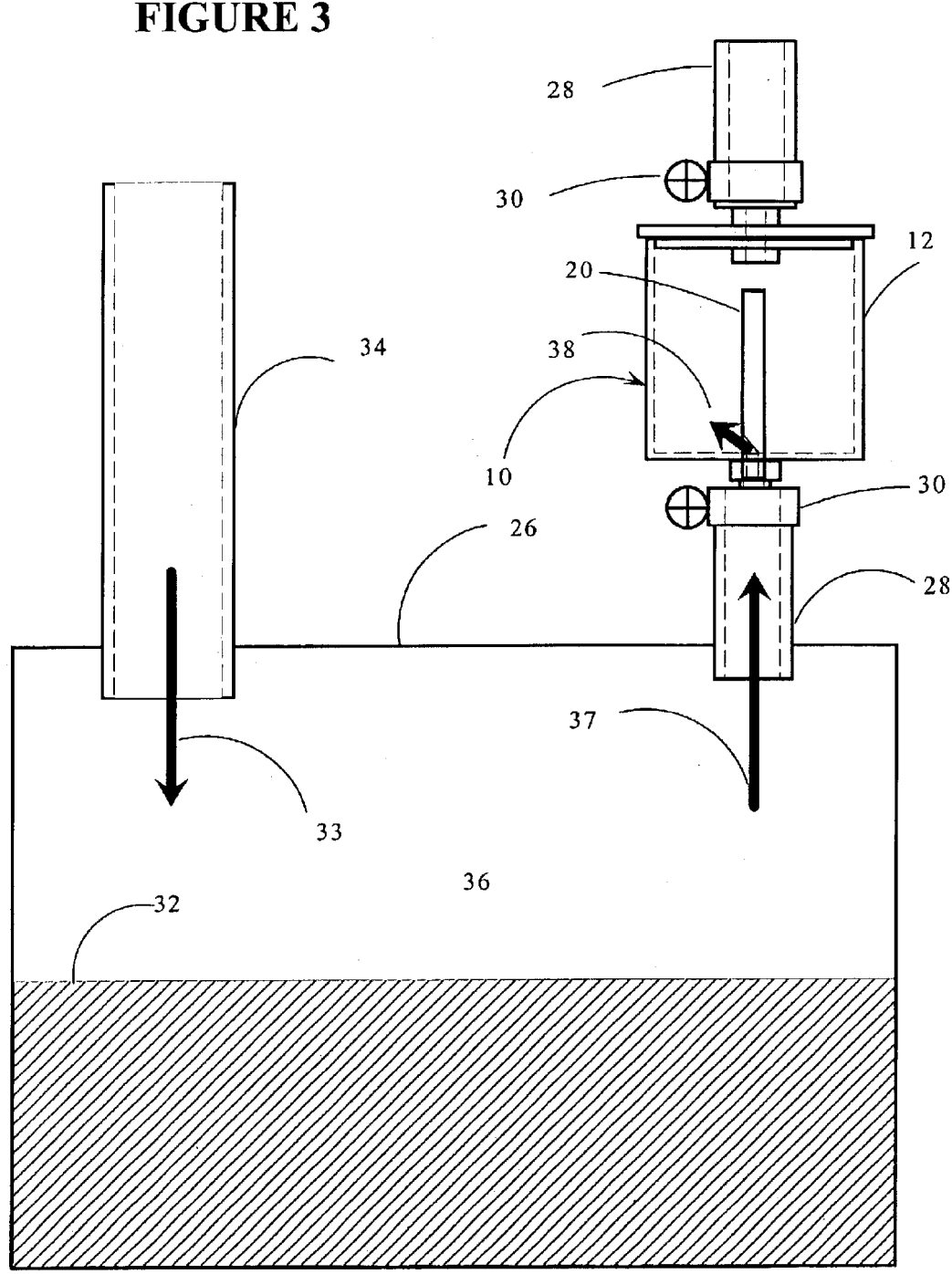
FIG. 3 presents a schematic side elevation of an accumulating whistling vent in accordance with a preferred embodiment of the present invention as incorporated into the vent line of a fuel tank.

Operation of accumulating whistling vent 10 is described with reference to FIG. 3, wherein tank 26 is being filled with fluid 32. Accumulating whistling vent 10 is coupled between vent line 28 of tank 26 via mounting tubes 16 and 18, and hose clamps 30. According to a preferred embodiment of the invention, accumulating whistling vent 10 is positioned near to the tank end of the vent line so as to minimize movement, and provide the earliest possible warning signal. If space is limited vent 10 could be placed further along vent line 28, but the time before overflow will be slightly reduced as a result.

When fluid 32 is introduced into tank 26 through fill line 34, air 36 within tank 26 exhausts through vent line 28, and whistle 20, as indicated by arrows 37 and 38. The sounding of whistle 20 indicates that space remains in the tank for additional liquid.

When the fluid level in tank 26 reaches its maximum, additional fluid is forced to flow through line vent 28 where it begins accumulating in reservoir base 12. As this additional liquid passes through whistle 20, the whistle is muted thus indicating a full tank.

An accumulating whistling vent as described above is beneficial for several reasons. If an operator does not hear the change in audible signal (i.e. the muting of whistle 20) due to excessive noise, reservoir base 12 prevents fluid from being immediately discharged into the environment through vent line 28. Instead, by accumulating excess fluid in reservoir base 12, whistling vent 10 provides additional time for the change in audible signal to be detected. Depending upon the flow rate of the fluid being introduced, therefore, one can extend the time between when the whistle is muted and overflow occurs, by increasing the size of reservoir base 12. The only limits being the amount of space available and the back pressure created by the accumulated fluid.

Accumulating whistling vent 10 is particularly beneficial for vehicular fuel tanks. This is because excess liquid can be stored in reservoir base 12 until such time as the fluid level in the tank drops. Thus, not only does accumulating whistling vent 10 reduce environmental waste it limits economic waste as well.

In the preferred embodiment of the invention reservoir base 12 is transparent. Thus, a visual indicator is provided in addition to the change in audible signal described above. As will be apparent to one skilled in the art, reservoir base 12 need not be transparent, but merely translucent such that fluid accumulation can be readily ascertained.

A fuel filter and brass key chain whistle are used in an embodiment of the invention to minimize manufacturing costs. As these items are readily available, no custom parts are required. Furthermore, unnecessary parts are avoided which in turn reduces possible failure modes and repair time.

While particular embodiments of the present invention have been shown and described, it is clear that changes and modifications may be made to such embodiments without departing from the true scope and spirit of the invention. Thus it is intended that the present invention cover the modifications and variations of this invention provided they come within the scope of the appended claims and their equivalents.

What is claimed is:

1. An accumulating whistling vent comprising:
    a whistle housing reservoir having a first and second end wherein a mounting tube extends from each of said ends;
    a whistle;
    wherein the intake of said whistle is housed within said mounting tube extending from said first end of said whistle housing reservoir;
    wherein the exhaust of said whistle extends into said whistle housing reservoir;
    wherein said whistle generates an audible signal when gaseous fluids pass therethrough; and
    wherein said whistle housing reservoir accumulates liquid fluids passing through said whistle.

2. An accumulating whistling vent as claimed in claim 1 wherein said whistle housing reservoir is translucent.

3. An accumulating whistling vent comprising:
    a reservoir base having a mounting tube extending therefrom;
    a lid having a mounting tube extending therefrom; and
    a whistle;
    wherein said lid is attached to said reservoir base such that a liquid fluid seal is formed;
    wherein the intake of said whistle is housed within said mounting tube of said reservoir base;
    wherein the exhaust of said whistle extends into said reservoir base;
    wherein said whistle generates an audible signal when gaseous fluids pass therethrough; and
    wherein said reservoir base accumulates liquid fluids passing through said whistle.

4. An accumulating whistling vent as claimed in claim 3 wherein said reservoir base is translucent.

5. An accumulating whistling vent as claimed in claim 3 wherein said housing reservoir and housing lid include a fuel filter base and fuel filter lid.

6. A level indicating system for use in a tank having a vent line comprising:
    an accumulating whistling vent including:
        a whistle housing reservoir having first and second ends wherein a mounting tube extending from each of said ends;
        a whistle;
        wherein the intake of said whistle is housed within said mounting tube in said first end of said whistle housing reservoir;
        wherein the exhaust of said whistle extends into said whistle housing reservoir;
        wherein said whistle generates an audible signal when gaseous fluids pass therethrough;

wherein said whistle housing reservoir accumulates liquid fluids passing through said whistle; and wherein said accumulating whistling vent is coupled between said vent line such that said first end is closest to said tank.

7. A level indicating system as claimed in claim 6 wherein said whistle housing reservoir is translucent.

8. A level indicating system for use in a tank having a vent line comprising:

an accumulating whistling vent including:

a reservoir base having a mounting tube extending therefrom;

a lid having a mounting tube extending therefrom;

a whistle;

wherein said lid is attached to said reservoir base such that a liquid fluid seal is formed;

wherein the intake of said whistle is housed within said mounting tube of said reservoir base;

wherein the exhaust of said whistle extends into said reservoir base;

wherein said whistle generates an audible signal when gaseous fluids pass therethrough;

wherein said reservoir base accumulates liquid fluids passing through said whistle; and wherein said accumulating whistling vent is coupled between said vent line such that said reservoir base is closest to the tank.

9. A level indicating system as claimed in claim 8 wherein said reservoir base is translucent.

* * * * *